3,224,927
FORMING INORGANIC FIBER MATERIAL CONTAINING CATIONIC STARCH AND COLLOIDAL SILICA
Robert L. Brown, West Chester, Pa., and George W. Sears, Jr., Wilmington, Del., assignors to E. I. du Pont de Nemours and Company, Wilmington, Del., a corporation of Delaware
No Drawing. Filed Oct. 4, 1963, Ser. No. 313,743
1 Claim. (Cl. 162—155)

This application is a continuation-in-part of my copending application Serial No. 129,226, filed August 4, 1961, now abandoned.

This invention relates to heat-resistant compositions of inorganic fibers bonded together largely by colloidal silica and more particularly is directed to a process for bonding together inorganic fibers with colloidal silica whereby the resulting compositions obtain high and stable strength under prolonged exposure to high temperatures.

The compositions produced by the process of this invention comprise specified inorganic fibers bonded in a three-dimensional network with colloidal silica in the proportion of 2 to 20% by weight based on the weight of said fibers and a positively charged starch in the proportion equal to 0.20 to 1.5% by weight based on the weight of said fibers.

These heat-resistant materials are prepared by dispersing in an aqueous medium the inorganic fibers, adding thereto a positively charged starch in the proportion equal to 0.20 to 1.5% by weight based on the weight of said fibers, then adding thereto colloidal silica in the proportion of 2 to 20% by weight based on the weight of said fibers, acidification to pH 3 to 5, removing said fibers from the aqueous medium and drying the resulting shaped product. It has been found that the acidification to pH 3 to 5 markedly increases the strength of the resulting product over that obtainable at the natural alkaline pH.

The product comprises articles made up of the inorganic fibers bonded together largely by colloidal silica. The articles may take the form of papers, pressed board, mats, or formed objects such as tubes, rods, blocks, or other molded objects.

The inorganic fiber is selected from the group consisting of asbestos, paligorskite, attapulgite, quartz, glass, aluminosilicates, and potassium titanate. The fibers preferably are very fine so that there are many points of contact. For this reason, forms of asebstos whose fibers are largely less than 0.05 micron in diameter will be stronger than those containing much coarser fibers such as within the range of 1 to 10 microns.

The colloidal silica acting as a binder is present in an amount equal to 2 to 20% by weight based on the weight of the fibers. However, in most cases it is preferred to use 10 to 20% by weight. While less than 2% silica could be used, for most applications the bond strengths would be insufficient to give adequate working strength. Since the silica is applied to the fibers by exhaustion from solution, it is difficult to increase the concentration beyond 20% without excessive losses in the filtrate.

Any of the silica sols of commerce may be used in this application. Although colloidal silica of any ultimate particle size will exhibit binding action, it is preferred to use those sols containing particles of average diameters in the range of 5 to 40 millimicrons. Larger particles give less binding action per unit weight of silica due to the smaller number of particles involved. For the same reason, it is preferred to use sols containing largely discrete particles rather than those containing large aggregates.

In order to exhaust the colloidal silica onto the surfaces of the fibers, it is first necessary to add a positively charged colloidal material, allow it to absorb onto th surfaces of the fibers, and then subsequently attract th negatively charged silica to itself by means of its residua poistive charge. Especially desirable for this purpose ar any of the positively charged starches commercially avail able, such as the Cato starches of National Starch Prod ucts, Inc. Starches which have a positively electrica charge on the starch molecule can be prepared by react ing ungelatinized starch with an etherifying agent cor taining a tertiary amino radical as described in U.S 2,813,093, to C. G. Caldwell and O. B. Wurzburg.

The positively charged starches are especially usefu in that in addition to their action as mordants, they als act as binders and impart considerable green strengt or strength prior to ignition to the article being made The article is thus strengthened by the starch until b heating the silica bonding can be developed by dehydra tion and crosslinking.

Organic binders, such as starch have been used here tofore with fibers such as asbestos, but such binders ar effective only at relatively low temperature and becom ineffective at temperatures well below the maximum us temperature of asbestos. Considerable smoking occur during use at high temperatures, and this is undesirabl in many applications. Consequently, in the present ir vention, it is desirable to keep the positively charge starch as low in concentration as possible. It is pre ferred to use no more than about 1.0% of the starc based on the total weight of solids.

The inorganic fibers such as asbestos fibers are di persed by forming a dilute suspension of the fibers i water and stirring until any aggregates of fibers ar swollen or broken apart. The upper limit of concentra tion of fibers in the suspension is limited by the abilit to stir the slurry and will ordinarily be about 15% b weight. The lower limit is largely determined by eco nomics, although exhaustion of the binder onto the fiber is less efficient at greater dilution than in more concer trated slurry. Stirring may be done by a simple paddl stirrer if the fibers are fragile and long, or by a highe speed propeller if danger of fiber breakage is small. , preferred method is the use of a beater as commonl used to disperse paper pulp.

A solution of the positive charged starch is added t the slurry containing the fibers as soon as the latter ar dispersed. The concentration of this starch solution unimportant, but it is preferred to make it as concer trated as possible in order to reduce the volume require to a minimum. A concentration of 2 to 4% is preferre The starches are generally stirred into cold water ar then the slurry heated nearly to the boiling point in ord to disperse and swell the granules. Extent of exhausti of the positively-charged starch particles onto the fibe varies depending on the amount of starch, the differen in charge, and the amount of fiber surface availabl There is added to the mixture no more than 1.5% t weight of the starch, based on the weight of the fibe If exhaustion is only partial, addition of greater cor centrations of the starch will largely be wasted, ar moreover will tend to coagulate the silica added next ar consequently reduce its efficiency. After the starch added, the slurry is stirred for at least 5 minutes to allo exhaustion to reach equilibrium.

For ultimate products in which appreciable organ content is undesirable, and which require high streng chiefly at elevated temperature, the amount of positive charged starch can be reduced to as low as 0.2 to 0.5 based on the weight of the fibers provided that the sili content is increased and the silica-fibers slurry is acic fied. Since one of the effects of addition of the cation starch is to increase the binding action between fibers in the form during drying and before use at elevated temperature, reduction of this additive will result in a slight loss in green strength. This effect, however, disappears after heating, due to the increase in strength of the inorganic bond caused by mild heating.

As soon as the positively charged starch has been exhausted onto the fibers, the colloidal silica is added and stirred into the slurry. As with the starch, the mixing is not critical, and high speed agitation is not essential. Thorough distribution through the slurry is of course necessary and should be accomplished within a minute or two. The silica may be added at any convenient concentration, although it is preferred to add it at as high a concentration as possible to conserve storage space. It will generally be added as received from the manufacturer.

Immediately following addition of the silica, the slurry is acidified to reduce the pH to the region 3 to 5. Although some binding effect is achieved by use of less than 10% silica based on the weight of fibers, it is much preferred to keep the silica content in the 10–20% range. It is recognized that some binding effect can be achieved in the absence of acidification, although, the best strengths achieved are considerably less than those obtained by the process of the present invention. In the absence of acidification, it has been found that silica contents in excess of 10% are largely without effect.

Any acid can be used for this purpose, such as the mineral acids or acetic acid, although sulfuric acid is preferred for economic reasons. It is perfectly feasible to use concentrated sulfuric acid (e.g., 95%) on large-scale production without any predilution, whereas on laboratory scale, pH control of such a process would be difficult. In the latter case, it is preferred to dilute the acid with at least 1 volume of water.

The acid is added so as to reduce the pH to the desired level within 1 to 5 minutes. This pH level should then be held for at least 5 minutes. For fibers which are acid-soluble such as asbestos, further acid additions must be made in order to maintain a low pH. Systems containing fibers which are inert to dilute acid, such as glass fibers, do not require further acid addition. For best results, the slurry should be stirred for a total of 15 to 30 minutes after acid addition, allowing the pH to drift after the first 5 minutes after acid addition, although at least as good results are obtained by holding the pH constant during the entire period.

The optimum pH to achieve maximum product strength is about 3.5. Product strength falls off with further decrease in pH, but remains roughly constant in the region of pH 3.5 to 5, above which strength again falls off.

In order to form the product from the dilute slurry, the water must be removed, as by filtration. In the making of paper, the slurry is filtered either batchwise or continuously on a filter screen and the water removed by pressing between filter cloths as by calendering. If other types of molded objects are desired, the slurry may be filtered to form a moist cake which can then be molded in forms, wrapped on mandrels, or the like.

The shaped form or wet paper is finally dried as by heating in an oven or passing over heated rolls. Preferably, the final temperature of the product should be raised to 150 to 175° C. to insure complete drying.

Inorganic fibers have heretofore been bonded chiefly with organic binders such as starch and casein. This is especially true in the field of asbestos papers and mats. Such binders, while strong at low temperature, are easily oxidized on heating, giving off smoke and fumes and rendering the product weak and substantially valueless for high temperature application.

By using the process of the present invention, starch-silica binders are effective to impart heretofore unobtainable strengths to inorganic fibers. Moreover, at elevated temperature the strength of the product does not deteriorate but actually in many cases becomes greater than before heating. The process of this invention, thus makes possible use of such products in applications in which they have not been feasible in the past. For example, asbestos paper retains most if not all of its strength for extended periods at 1000° F., conditions under which nearly all strength has been lost heretofore.

This invention will be better understood by reference to the following illustrative examples in addition to those already given.

*Example 1*

After slowly stirring a mixture of 7 grams of grade 5R asbestos fibers, which means:

| Grade fiber | Mesh size | Percent fibers passed | Percent fibers collected |
|---|---|---|---|
| 6D | 4 | 100 | 0 |
|  | 10 | 67 | 44 | and 14.5 grams of grade 6D asbestos fibers, which means:

| Grade fiber | Mesh size | Percent fibers passed | Percent fibers coected |
|---|---|---|---|
| 5R | 4 | 100 | 0 |
|  | 10 | 37 | 44 | in 1 liter of water, 13.5 milliliters of a 1.5% solution of positively charged starch is added. After stirring 10 minutes, 10 milliliters of a silica sol containing 10% silica is added, and glacial acid is added to reduce the pH of the slurry to 2.5, and stirring is continued for 10 minutes, and further acetic acid is added to maintain the pH at 2.5 for a total of 20 minutes. Three liters of water is added to the slurry and the mixture dumped into the 8 inch by 8 inch head box of a hand-sheet paper making apparatus. The water is filtered out as soon as currents in the slurry subside, and the wet sheet on the 100 mesh filter screen is pressed between blotters by light calendering, removed from the screen, and further pressed between fresh blotters, and then dried on a hot plate at 340° F. The tensile strength of this 20 mil paper is as follows:

| Heated 1 hour, ° F | None | 600 | 1,000 |
|---|---|---|---|
| Lbs./in | 5.7 | 1.9 | 6.6 |

*Example 2*

To a slowly stirred mixture of 7 grams of grade 5R (as defined in Example 1) and 14.5 grams of grade 6D (as defined in Example 1) asbestos fibers in 1 liter of water, 13.5 milliliters of a 1.5% solution of positively charged starch is added. After stirring for 10 minutes, 10 milliliters of a silica sol containing 10% silica is added, and glacial acetic acid immediately added to reduce the pH within one minute to 3.5, and stirring is continued for 10 minutes, and further acetic acid is added to maintain the pH at 3.5 for a total of 20 minutes. Three liters of water is added to the slurry and the mixture dumped into the 8 inch by 8 inch head box of a hand-sheet paper making apparatus. The water is filtered out as soon as currents in the slurry subside, and the wet sheet on the 100 mesh filter screen is pressed between blotters by light calendering, removed from the screen, and further pressed between fresh blotters, and then dried on a hot plate at 340° F. The tensile strength of this 20 mil paper is as as follows:

| Heated 1 hour, °F | None | 600 | 1,000 |
|---|---|---|---|
| Lbs./in | 7.9 | 5.5 | 7.4 |

*Example 3*

To a slowly stirred mixture of 7 grams of grade 5R (as defined in Example 1) and 14.5 grams of grade 6D (as defined in Example 1) asbestos fibers in 1 liter of water, 13.5 milliliters of a 1.5% solution of positively charged starch is added. After stirring 10 minutes, 20 milliliters of silica sol containing 10% silica is added and glacial acetic acid immediately added to reduce the pH within 1 minute to 3.5 and stirring is continued for 10 minutes. This pH is held constant by further acid addition for a total of 20 minutes. Three liters of water is added to the slurry and the mixture dumped into the 8 inch by 8 inch head box of a hand-sheet paper making apparatus. The water is filtered out as soon as currents in the slurry subside, and the wet sheet on the 100 mesh filter screen is pressed between blotters by light calendering, removed from the screen, and further pressed between fresh blotters, and then dried on a hot plate at 340° F. The tensile strength of this 20 mil paper is as follows:

| Heated 1 hour, °F | None | 600 | 1,000 |
|---|---|---|---|
| Lbs./in | 10.6 | 8.5 | 12.9 |

*Example 4*

To a slowly stirred mixture of 7 grams of grade 5R (as defined in Example 1) and 14.5 grams of grade 6D (as defined in Example 1) asbestos fibers in 1 liter of water, 13.5 milliliters of a 1.5% solution of positively charged starch is added. After stirring 10 minutes, 20 milliliters of silica sol containing 10% silica is added and glacial acetic acid immediately added to reduce the pH within 1 minute to 5.0 and stirring is continued for 10 minutes. This pH is held constant by further acid addition for a total of 20 minutes. Three liters of water is added to the slurry and the mixture dumped into the 8 inch by 8 inch head box of a hand-sheet paper making apparatus. The water is filtered out as soon as currents in the slurry subside, and the wet sheet on the 100 mesh filter screen is pressed between blotters by light calendering, removed from the screen and further pressed between fresh blotters, and then dried on a hot plate at 340° F. The tensile strength of this 20 mil paper is as follows:

| Heated 1 hour, °F | None | 600 | 1,000 |
|---|---|---|---|
| Lbs./in | 9.5 | 6.5 | 11.5 |

*Example 5*

To a slowly stirred mixture of 7 grams of grade 5R (as defined in Example 1) and 14.5 grams of grade 6D (as defined in Example 1) asbestos fibers in 1 liter of water, 13.5 milliliters of a 1.5% solution of positively charged starch is added. After stirring 10 minutes, 20 milliliters of silica sol containing 10% silica is added and 50% sulfuric acid is used instead of glacial acetic acid and the pH of the acidified slurry is adjusted to 3.75 and stirring is continued for 10 minutes. The pH is held constant by further acid addition for a total of 20 minutes. Three liters of water is added to the slurry and the mixture dumped into the 8 inch by 8 inch head box of a hand-sheet paper making apparatus. The water is filtered out as soon as currents in the slurry subside, and the wet sheet is pressed between blotters by light calendering, removed from the screen, and further pressed between fresh blotters, and then dried on a hot plate at 340° F. The tensile strength of this 20 mil paper is as follows:

| Heated 1 hour, °F | None | 600 | 1,000 |
|---|---|---|---|
| Lbs./in | 10.1 | 7.5 | 10. |

*Example 6*

To a two-liter slurry containing 20 grams of fine aluminum silicate dispersed by beating 5 minutes in Hermann Disintegrator is added 13.5 milliliters of a 1.5% solution of positively charged starch. The slurry is gently stirred 10 minutes, and then 6 milliliters of silica sol containing 30% silica is added. The slurry is immediately acidified to pH 3.6 with 25% sulfuric acid an stirring continued for 20 minutes during which time the pH stayed constant. The slurry is diluted to 4 liters then dumped into the 8 inch by 8 inch head box of hand-sheet paper making apparatus. The water is filtered out as soon as currents in the slurry subside, an the wet sheet on the 100 mesh filter screen is pressed between blotters by light calendering, removed from the screen, and further pressed between fresh blotters, an then dried on a hot plate at 340° F. The tensile strength of this sheet is as follows:

Lbs./in
As is _____ 1.
15 min. at 900° C. _____ 2.

We claim:

In a process for making a heat-resistant material b dispersing in an aqueous medium an inorganic fibe selected from the group consisting of asbestos, paligor kite, attapulgite, quartz, glass, aluminosilicates and pc tassium titanate, adding positively charged starch an colloidal silica, removing said fibers from the aqueou medium, and drying the resulting shaped product, th steps comprising (1) first adding the positively charge starch to the said dispersion in the proportion of 0.2 t 1.5% by weight based on the weight of said fibers, (2 then adding the colloidal silica in the proportion of 1 to 20% by weight based on the weight of the fibers, an (3) then adding acid in an amount sufficient to lowe the pH of the dispersion to the range of 3 to 5.

References Cited by the Examiner
UNITED STATES PATENTS

| 2,721,139 | 10/1955 | Arledter | 162—1! |
| 2,919,211 | 12/1959 | Labino | 162—1! |
| 2,935,436 | 5/1960 | Caldwell et al. | 162—17 |
| 3,016,325 | 1/1962 | Pattilloch | 162—1( |
| 3,017,318 | 1/1962 | Labino et al. | 162—1! |
| 3,022,213 | 2/1962 | Pattilloch et al. | 162—1٤ |

DONALL H. SYLVESTER, *Primary Examiner.*